United States Patent Office.

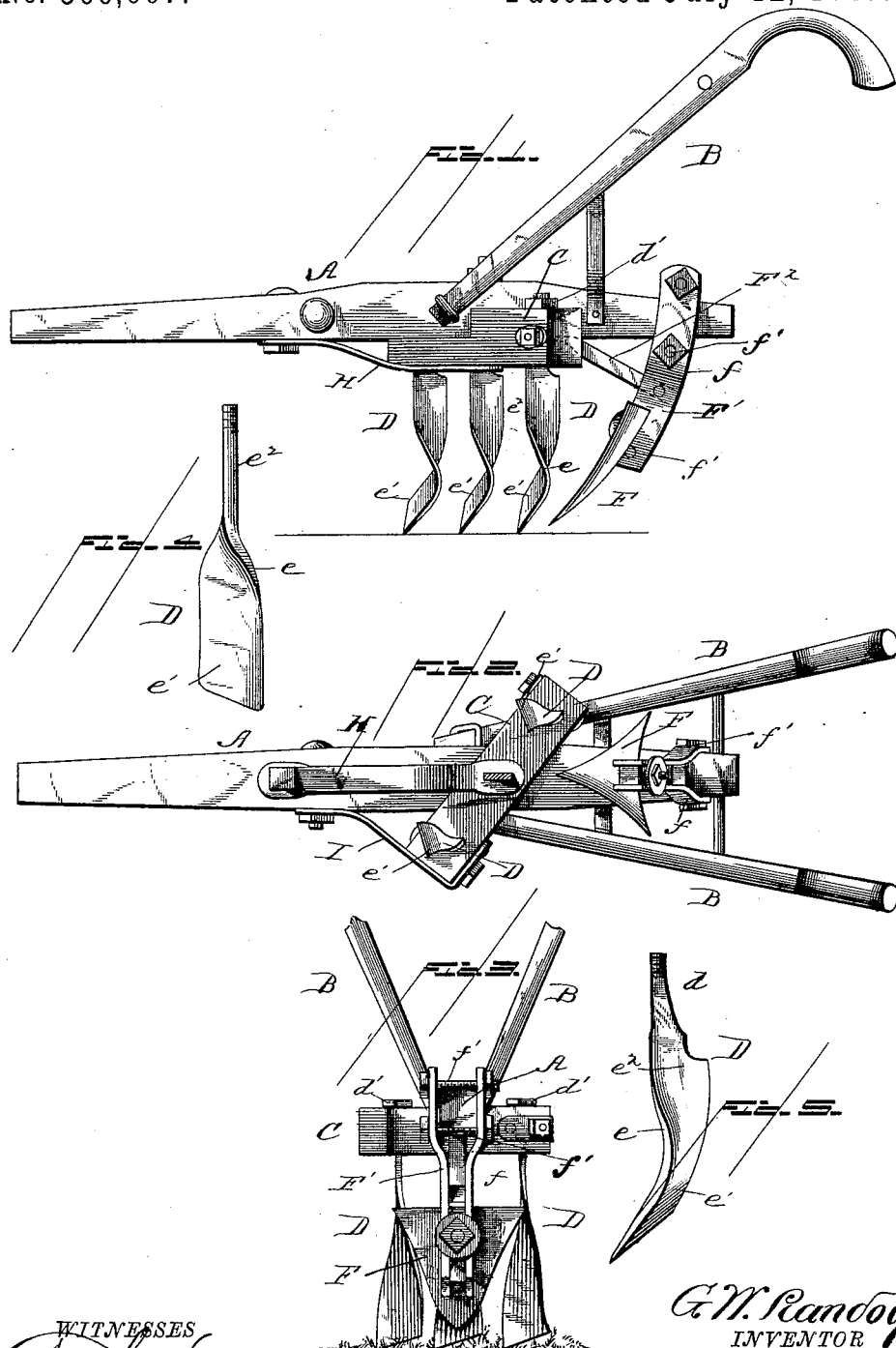

GEORGE W. RANDOLPH, OF MEMPHIS, TENNESSEE.

SIDE HARROW AND CULTIVATOR.

SPECIFICATION forming part of Letters Patent No. 366,607, dated July 12, 1887.

Application filed May 31, 1887. Serial No. 239,855. (No model.)

*To all whom it may concern:*

Be it known that I, GEORGE W. RANDOLPH, a citizen of the United States, residing at Memphis, in the county of Shelby and State of Tennessee, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in cultivators of that class which employ a series of vertical teeth arranged in advance of a shovel or plow; and it consists of the peculiar construction and arrangement of parts, as will be hereinafter fully described, and particularly pointed out in the claims.

The present invention is especially designed as an improvement upon the device shown in Patent No. 271,599, issued on February 6, 1883, to William Carruth and myself jointly, and it has for its object to provide a series of teeth for cleaning the furrow between the hills of growing plants of weeds and other obstructions in its path, which teeth are peculiarly constructed and arranged so as to incline rearwardly toward a shovel or plow, and thus permit the weeds, &c., to pass freely between the teeth and in the path of the rear shovel, the inclination of the teeth serving to facilitate the passage of the loosened earth, and thereby reduce the resistance to the passage of the implement and correspondingly lighten the draft.

A further object of my invention is to simplify and cheapen the cost of the implement and improve the same in minor details, with a view to increasing the strength and stability of the structure.

In the accompanying drawings, Figure 1 is a side elevation of a cultivator embodying my improvements. Fig. 2 is a bottom plan view thereof, with the shank of the central tooth of the series of teeth in section to show the manner of securing one end of the central brace. Fig. 3 is a rear elevation, and Figs. 4 and 5 are detached detail views, of one of the teeth.

Referring to the drawings, in which like letters of reference denote corresponding parts in all the figures, A designates the draft-beam of the implement, to which is secured the usual handles, B, for guiding the cultivator. A transverse beam or bar, C, is arranged diagonally across the draft-beam and rigidly secured thereto in any suitable manner, and this diagonal beam carries a series of vertical teeth, D, preferably three in number. These teeth are secured to the diagonal beam equidistant from each other, and the upper wedge shaped ends or shanks, $d$ $d$, of the teeth are fitted in vertical slots or openings in the beam to prevent the teeth from twisting or displacement, the extreme upper ends of the teeth being threaded and receiving a nut, $d'$, by means of which the teeth are prevented from dropping out of the beam. These vertical teeth are of a peculiar pattern and are arranged in a novel manner with respect to the diagonal and draft beams, which I will now proceed to describe. The teeth are twisted at an intermediate point of their length, as at $e$, to cause the lower portion, $e'$, to lie at an angle to the upper portion, $e^2$, and the extreme lower end of each tooth is beveled or inclined upwardly from the front edge of the tooth toward the rear edge thereof. The upper part of these teeth are arranged to present a sharp edge to the soil, and have a quarter-twist at or near the center of the teeth to bring the cutting-blade square with the line of progress. The teeth are arranged and secured in the diagonal beam so that the lower portions, $e'$, thereof incline rearwardly toward a depending shovel or plow, F.

By reference to Fig. 2 of the drawings it will be seen that the lower portions, $e'$, of the twisted teeth are arranged at approximately an acute angle to the longitudinal axis of the diagonal beam, and likewise to the line of draft of the main draft-beam A.

I attach especial importance to the peculiar construction and arrangement of the twisted teeth and the shovel in rear of the same, as I am thereby enabled to provide a cultivator of very light draft which operates effectively in removing and clearing weeds, &c., between the hills, and throws the earth properly upon the hills.

The lower inclined portions of the twisted teeth are arranged parallel with each other, and the shovel or plow which catches the soil deflected by the teeth is of such a width as to throw the soil, &c., upon the hills in the most advantageous manner.

At the rear end of the draft-beam is a shovel-bracket, F', preferably made of the arms or plates $f\,f$, and secured to the beam A by means of bolts $f'\,f'$, which pass through the arms and clasp the beam closely. These arms or plates $f\,f$, after being secured to the beam in the manner described, are contracted or brought nearer together at a point below the beam, and at or near the point where the arms are contracted a brace-rod, F², is fitted between the arms and connected thereto by a bolt, the opposite end of the brace being secured to the beam by means of screws or the like.

The shovel F is secured at the lower end of the bracket F' by means of a bolt which passes through the shovel and between the arms $f\,f$, the rear end of the bolt being provided with a washer, $g$, and a nut, $g'$, as shown in Figs. 2 and 3.

In the under side of the draft-beam A is cut at a suitable point a diagonal recess or groove for the reception of the upper side of the diagonal beam C, which is likewise formed with a recess, into which the lower side of the draft-beam A is fitted, thereby firmly uniting the two beams together.

The diagonal or transverse beam C is further strengthened and braced by means of a rod, H, which is formed at its lower rear end with an opening or slot, through which the central tooth of the series of the teeth passes, as seen in Fig. 2, and the opposite end of the said central brace, H, is secured to the draft-beam in any suitable manner.

It will be seen that the vertical slots in the diagonal beam C are made rectangular in form and diagonal to the longitudinal axis of the said beam, and that the shanks of teeth are of similar shape, to prevent the teeth from twisting and to cause them to assume the proper position relative to the draft and diagonal beams.

When the cultivator is in use, the teeth, being twisted and arranged in the peculiar manner described in relation to the draft and diagonal beams, allow weeds and other obstructions to be readily deflected between the same, and the shovel acts at the same time to throw the dirt upon the hills.

A brace-rod, I, is secured to the cross-beam at one end and to the draft-beam at its opposite end, as shown, thus serving to further brace the diagonal beam.

While reserving to myself the right to make such changes and alterations as fall within the scope of my invention, what I claim as new, and desire to secure by Letters Patent, is—

1. In a harrow and cultivator, the teeth D, of plates of steel, cut away in wedge shape to form the shank, the upper part of said teeth arranged to present a sharp edge to the soil and have a central quarter-twist to bring the cutting-blade square with the line of progress, and having the share-edge inclined upwardly from the point, substantially as described and shown.

2. The combination, in a cultivator, with a draft-beam and a diagonal beam secured thereto, of a series of vertical teeth, D, fixed to the diagonal beam, said teeth being twisted at an intermediate point of their length and having the lower portions thereof arranged in regular diagonal rank, and a shovel carried by the draft-beam in rear of the series of teeth, substantially as described and shown.

In testimony whereof I affix my signature in presence of two witnesses.

GEORGE W. RANDOLPH.

Witnesses:
J. P. RANDOLPH,
T. W. LANVILL.